United States Patent [19]

Vetter, Jr.

[11] 4,137,382

[45] Jan. 30, 1979

[54] PROCESS FOR COPOLYMERIZING ETHYLENE, VINYL ACETATE AND CARBON MONOXIDE TO PROVIDE COPOLYMERS OF REDUCED MELT FLOW RATE

[75] Inventor: Clarence J. Vetter, Jr., Atwood, Ill.

[73] Assignee: National Distillers and Chemical Corporation, New York, N.Y.

[21] Appl. No.: 832,762

[22] Filed: Sep. 12, 1977

[51] Int. Cl.$^2$ .............................................. C08G 67/02
[52] U.S. Cl. .................................... 528/271; 528/392; 260/17 R; 260/28.5 AV; 260/827; 260/837 R; 260/859 R; 260/873; 260/897 B; 260/897 C
[58] Field of Search ................... 526/11.1; 260/63 CQ, 260/884

[56] References Cited

U.S. PATENT DOCUMENTS

| | | | |
|---|---|---|---|
| 2,495,286 | 1/1950 | Brubaker | 526/11.1 |
| 3,334,081 | 8/1967 | Madgwick et al. | 526/11.1 |
| 3,530,109 | 9/1970 | Fenton | 260/63 CQ |
| 3,780,140 | 12/1973 | Hammer | 260/884 |
| 3,790,460 | 2/1974 | Weintraub | 526/11.1 |
| 3,835,123 | 9/1974 | Nozaki | 526/11.1 |
| 3,948,850 | 4/1976 | Hudgin | 526/11.1 |
| 3,948,873 | 4/1976 | Hudgin | 526/11.1 |
| 3,988,509 | 10/1976 | Ballard et al. | 260/63 CQ |
| 4,024,325 | 5/1977 | Hudgin | 526/11.1 |
| 4,024,326 | 5/1977 | Hudgin | 526/11.1 |

*Primary Examiner*—Herbert J. Lilling
*Attorney, Agent, or Firm*—Kenneth D. Tremain

[57] ABSTRACT

A termonomer mixture of ethylene, vinyl acetate and not more than about 5 weight percent carbon monoxide is copolymerized to provide a resin of desirable rheological properties e.g. low Melt Flow Rate and a high melt viscosity, when prepared at temperatures not exceeding about 260° F.

5 Claims, No Drawings

PROCESS FOR COPOLYMERIZING ETHYLENE, VINYL ACETATE AND CARBON MONOXIDE TO PROVIDE COPOLYMERS OF REDUCED MELT FLOW RATE

BACKGROUND OF THE INVENTION

1. Field of the Invention

This invention relates to the field of copolymers of ethylene, vinyl acetate and carbon monoxide, and more particularly, to processes for preparing such copolymers.

2. Description of the Prior Art

U.S. Pat. No. 3,780,140 describes the preparation of copolymers consisting essentially of by weight (a) 40–80% ethylene, (b) 3–30% carbon monoxide, and (c) 5–60% of one or more termonomers copolymerizable therewith, preferably vinyl acetate. The preferred copolymers include those consisting essentially of 56–76% ethylene, 3–15% carbon monoxide, and 10–34% termonomer. The copolymers are said to have a melt index normally within the range of 0.1–3000, and preferably 1–500. Blends of these copolymers with other polymers such as polyvinyl chloride and wax are also described. Where the polymer to be blended with the copolymers is wax, the preferred copolymer contains no more than about 5% carbon monoxide, and when the termonomer is vinyl acetate, 10–26% vinyl acetate is preferred (col. 2, lines 26 to 51). The flow of ethylene, carbon monoxide, monomers and catalyst into the polymerization reactor is controlled so that the monomers enter the reactor in continuous molar ratios and at the same rate at which product and unreacted monomers are discharged from the reactor. The reactor temperature should be at least 140° C. (284° F.), preferably 155–300° C. (311–571° F.) and most preferably 155–225° C. (311–437° F.), and the reactor pressure should be maintained within the range 5000–60,000 p.s.i., preferably about 20,000–35,000 p.s.i. (col. 3, lines 28 to 45). The data in this patent show no consistent or predictable relationship between polymerization temperature and melt index, the latter being a factor directly related to Melt Flow Rate (MFR).

U.S. Pat. No. 3,334,081 describes a process for polymerizing ethylene in a tubular reactor in the presence of a chain transfer agent at from 15,000 p.s.i.g. to about 100,000 p.s.i.g. and at a temperature of from about 90° C. to about 350° C. (194 to 662° F.). The process is also applicable to the copolymerization of ethylene with numerous ethylenically unsaturated monomers, vinyl acetate among them. The patent also discloses that the process can be used to produce copolymers of ethylene with carbon monoxide in which the carbon monoxide charged can vary from 0.1 to about 20 mole percent of the total flow of ethylene to the reactor. U.S. Pat. No. 3,334,081 fails to disclose any terpolymer of ethylene, vinyl acetate and carbon monoxide.

U.S. Pat. No. 3,153,029 describes copolymers of ethylene and vinyl acetate or carbon monoxide modified with a terminating agent, among which are included carbon monoxide. There is no disclosure in this patent of reacting ethylene monomer and vinyl acetate monomer with carbon monoxide.

U.S. Pat. No. 2,702,794 discloses the emulsion copolymerization of ethylene and vinyl acetate at temperatures of from −50 to 125° C. (−58 to 257° F.). Other polymerizable monomers can be added as third components in minor amounts such as carbon monoxide, maleic anhydride, allyl glycidyl ether, methyl hydrogen maleate, maleimide, sulfur dioxide, vinyl chloride and acrylate and methacrylate esters. There is nothing in U.S. Pat. No. 2,702,794 which points to any advantage in copolymerizing ethylene, vinyl acetate and carbon monoxide.

U.S. Pat. No. 2,495,286 describes the copolymerization of carbon monoxide and an ethylenically unsaturated comonomer such as ethylene, with other comonomers such as vinyl acetate. Polymerization is carried out at from 25° C. to as high as 350° C. (77° F. to as high as 662° F.). Example 15 of the patent is illustrative of the preparation of a copolymer of carbon monoxide, ethylene and vinyl acetate. As discovered herein, the carbon monoxide content of the terpolymer is, at 37%, far higher than the maximum tolerable amount for a copolymer demonstrating improved MFR.

SUMMARY OF THE INVENTION

It has surprisingly been found that a termonomer mixture of ethylene, vinyl acetate and from about 0.5 weight percent to about 5 weight percent carbon monoxide copolymerized under controlled conditions provides a copolymerizate of desirable rheological properties, for example low MFR when copolymerized at temperatures up to about 260° F. This discovery is totally unexpected in view of the prior art, supra, none of which discloses or suggests the existence of a relationship between polymerization temperature, carbon monoxide concentration and MFR such as that disclosed herein.

As is well known, a reduction in MFR is equivalent to an increase in melt viscosity, and is indicative of a copolymer of higher average molecular weight. The higher molecular weight ethylene-vinyl acetate-carbon monoxide terpolymers of this invention are advantageously melt blended with other polymers, notably, polyvinyl chloride, to provide improved resin performance characteristics such as impact strength.

DESCRIPTION OF THE PREFERRED EMBODIMENTS

The amount of ethylene in the termonomer mixture of this invention can vary from about 15 to about 85 percent by weight, the balance of the mixture being made up of vinyl acetate and an amount of carbon monoxide constituting nior more than about 5 weight percent of the total mixture. Generally, at least about 0.5 weight percent of carbon monoxide is employed in the reaction mixture. In a preferred mode, the reaction mixture contains, on a weight basis, from about 40 to about 70% ethylene, from about 25 to about 55% vinyl acetate and from about 1 to about 5% carbon monoxide. A highly preferred termonomer reaction mixture is made up of about 55% ethylene, 40% vinyl acetate and 5% carbon monoxide.

In addition to ethylene and vinyl acetate, it is within the scope of this invention to include small quantities, not exceeding about 10 percent of the weight of the copolymerization mixture, of one or more other ethylenically unsaturated monomers copolymerizable under the conditions of the process of this invention. Such monomers include the acrylic, haloacrylic and methacrylic acids, esters, nitriles and amides, as for example, acrylic acid, chloroacrylic acid, methacrylic acid, methyl acrylate, ethyl acrylate, cyanoethoxyethyl acrylate, cyanoethyl acrylate, butyl acrylate, 2-ethylhexyl acrylate, methyl chloroacrylate, methyl methacrylate, ethyl methacrylate, butyl methacrylate, octyl methacrylate, cyclohexyl methacrylate, methoxymethyl methacrylate, n-butoxyethoxyethyl methacrylate, chloroethyl methacrylate, diethylene glycol diacrylate, acrylonitrile, chloroacrylonitrile, methacrylonitrile, acrylamide, chloroacrylamide, methylacrylamide, N-methylacrylamide, N-ethylmethacrylamide, N,N-diethylacrylamide and beta-diethylaminoethyl methacrylate; the vinyl and vinylidene halides such as vinyl chloride, vinyl fluoride, vinylidene chloride, vinylidene fluoride and 1-chloro-1-fluoroethylene; other vinyl esters such as vinyl propionate, vinyl butyrate, vinyl crotonate, vinyl isobutyrate, vinyl thioacetate, vinyl benzoate, vinyl chloroacetate, vinyl dimethylacetate, vinyl trimethylacetate, vinyl hexanoate, vinyl stearate and vinyl laurate; the N-vinyl imides such as N-vinylphthalimide and N-vinyl succinimide; the N-vinyl lactams such as N-vinylcaprolactam, and N-vinylbutyrolactam; the N-vinyl aryls such as styrene, alpha chloro styrene and vinylnaphthalene; the vinyl ethers such as vinyl methyl ether, vinyl butyl ether and vinyl phenyl ether; the vinyl ketones such as vinyl methyl ketone, vinyl ethyl ketone, ethyl isopropenyl ketone, vinyl 2-ethylhexyl ketone and vinyl phenyl ketone; and other vinyl monomers such as vinyl pyridine, divinyl sulfone, methyl vinyl sulfone vinyl carbazole, vinyl sulfonic esters and sodium vinyl sulfone.

The copolymerization of ethylene, vinyl acetate and carbon monoxide, and optionally, additional ethylenically unsaturated monomers such as recited above, can be carried out in accordance with known and conventional techniques. Preferably, the polymerization temperature does not exceed about 260° F.

The ethylene, vinyl acetate and carbon monoxide are introduced into the polymerization zone in constant molar ratios and at the same rate as copolymerizate and unreacted monomers are withdrawn from the zone. The monomers are intimately admixed within the polymerization zone, generally by stirring. The temperature of copolymerization is maintained at from about 150° F. up to about 250° F. Preferably this temperature is within the range of from about 170° F. to about 240° F. Pressure in the polymerization zone can vary within wide limits, and pressures of from about 5,000 to about 60,000 p.s.i. are useful. It is preferred herein to utilize a pressure of from about 20,000 to about 35,000 p.s.i.

The reaction of ethylene, vinyl acetate and carbon monoxide in accordance with this invention is carried out in the presence of a free radial initiator commonly employed in the copolymerization of ethylene and vinyl acetate. Representative of such initiators are the peresters, the azo compounds and the percarbonates. Selected compounds within these groups are dilauroyl peroxide, ditertiary butyl peroxide, tertiary butyl perisobutyrate, tertiary butyl peracetate, a, a'-azobisisobutyronitrile and other compounds of comparable free radical activity. Generally, the initiator is dissolved in an inert solvent such as benzene, kerosene, mineral oil or mixtures of such solvents. The initiator can be employed at from about 25 to 2500 ppm, preferably from about 50 to 500 ppm, based on the weight of monomers in the polymerization zone.

The copolymers herein preferably exhibit MFRs of from about 0.2 to about 3.0. Due to their relatively high molecular weight, they are especially useful for blending with other organic polymers. In general, the copolymers can be blended with the other organic polymers in any sequence of addition employing known and conventional procedures which include melt blending on a roll mill, in an extruder or in a Banbury mixer. The blends can contain from about 5 to about 95% of the copolymer herein with from 95 to about 5% by weight of a blend polymer. Blend copolymers which can be used herein include polyamides; cellulose-derived polymers such as cellulose acetate, propionate, butyrate, regenerated cellulose and nitrocellulose; vinyl halide polymers in which the vinyl halide is at least 80 percent by weight of the polymer, such as polyvinyl chloride, copolymers of vinyl chloride with olefins (ethylene and propylene particularly), vinyl acetate, and vinyl ethers, vinylidene halide polymers such as polyvinylidene fluoride and a copolymer of vinylidene chloride and vinyl chloride; alphaolefin-based polymers having 2 to 12 carbon atoms, such as polyethylene, polypropylene, chlorosulfonated polyethylene, chlorinated polyethylene as well as other halogenated polyolefins, ionomers [ethylene/(meth)acrylic acid copolymers neutralized with an alkali metal hydroxide], ethylene/vinyl ester copolymers (i.e., vinyl ester of saturated carboxylic acid such as vinyl acetate, vinyl propionate, vinyl butyrate, vinyl stearate) of about 15 to 98 percent vinyl ester and hydrolyzed polymers derived therefrom (ethylene/vinyl alcohol), polymers of styrene such as styrene/methacrylic acid, styrene/acrylonitrile; polymers of acrylonitrile such as polyacrylonitrile, copolymers of at least 40 percent acrylonitrile using other ethylenically unsaturated comonomers such as vinyl acetate, vinyl chloride, ethylene and isobutylene; acrylics such as alkyl esters of ethylenically unsaturated carboxylic acids, e.g., alkyl acrylates and alkyl methacrylates wherein the alkyl group is from 1 to 18 carbon atoms; polyesters such as polyethylene terephthalate and poly-1,4, cyclohexylene dimethylene terephthalate; polyurethanes; polycarbonates; phenolics; polysulfones, epoxy resins; chlorinated polyethers; alkyd resins, acetal resins; ABS resins; silicone resins; tars (asphalt) and waxes such as the petroleum waxes (paraffin wax and microcrystalline wax), and chlorinated waxes. The polymer blends herein can also contain such conventional ingredients as antioxidants, ultraviolet stabilizers, plasticizers, pigments, fillers, slip and antiblock agents, and like materials.

The following experiment as summarized in Table I, below, illustrates the importance of carbon monoxide in the preparation of the copolymers of this invention. The introduction of 2 weight percent carbon monoxide in the monomer make-up resulted in a dramatic decrease in Melt Flow Rate for Product B as measured by ASTM 1238-70, Procedure A, Condition B. Product D which was prepared with 7 weight percent carbon monoxide produced a terpolymer with a Melt Flow Rate so low that it would not extrude from the hopper.

TABLE I

| | AVERAGE SYNTHESIS CONDITIONS BEFORE, DURING, AND AFTER LOW MFR PRODUCTION | | | |
|---|---|---|---|---|
| | Product A | Product B | Product C | Product D |
| Time Period | 1230–1400 | 1500–1800 | 1830–2030 | — |
| Initiator | 1%DIBP[1]/MS[2] | 1%DIBP/MS | 1%DIBP/MS | 3%DIBP/MS |

TABLE I-continued
AVERAGE SYNTHESIS CONDITIONS BEFORE, DURING, AND AFTER LOW MFR PRODUCTION

|  | Product A | Product B | Product C | Product D |
|---|---|---|---|---|
| Rate of Initiator Addition, lb./hr. | 0.027 | 0.031 | 0.026 | 0.059 |
| Initiator Efficiency lb/Polymer/lb. Catalyst | 1070 | 950 | 960 | 780 |
| Make-up Ethylene Rate, lb./hr. | 209 | 213 | 210 | 85 |
| Make-up Vinyl Acetate Rate, lb./hr. | 151 | 165 | 150 | 130 |
| Make-up CO Rate, lb./hr. | 0 | 8 | 0 | 15 |
| E/VA/CO in Make-up | 58/42/0 | 55/43/2 | 58/42/0 | 37/56/7 |
| Reactor Feed Rate, lb/hr. | 416 | 480 | 462 | 579 |
| Reaction Pressure, psi | 30,000 | 30,000 | 30,000 | 30,000 |
| Avg. Feed Temperature, °F. | 101 | 103 | 102 | 132 |
| Avg. Reactor Temperature, °F. | | | | |
| Level 1 | 225 | 241 | | |
| | 226 | | | |
| Level 2 | 231 | 230 | 232 | 261 |
| Level 3 | 231 | 233 | 235 | 258 |
| Level 4 | 232 | 232 | 235 | 253 |
| Level 5 | 231 | 230 | 230 | 245 |
| Level 6 | 229 | 225 | 228 | 244 |
| Production Rate, lb./hr. | 29 | 29 | 25 | 46 |
| Monomer Conversion, % | 7 | 6 | 5 | 7.9 |
| Melt Flow Rate,[3] | 2.6 | 0.23 | 2.1 | — |
| % Vinyl Acetate | 38.4 | 43.5 | 40.9 | — |
| % CO | — | 7 | — | — |

[1] DIBP is diisobutyryl peroxide.
[2] MS is deodorized mineral spirits
[3] ASTM 1238-70, Procedure A, condition B (measurements made at 125° C. and 2160 g load).

The following experiment, summarized in Table II, below, demonstrates the criticality of the polymerization temperature of this invention. The product MFR of the terpolymer of Table I (Product B) is compared with two terpolymers (Products E and F) obtained at polymerization temperatures (representing the average temperature of six reactor levels) in excess of 250° F. In the case of the latter, the MFR of the terpolymers was substantially higher than the terpolymer prepared in accordance with the present invention.

TABLE II
E/VA/CO TERPOLYMERS PREPARED AT DIFFERENT POLYMERIZATION TEMPERATURES

|  | Product B | Product E | Product F |
|---|---|---|---|
| Initiator | 1%DIBP/MS | 1%DIBP/MS | 1%DIBP/MS |
| Rate of Initiator Addition, lb./hr. | 0.031 | 0.028 | 0.031 |
| Initiator Efficiency, lb. Polymer/lb. Catalyst | 950 | 1320 | 1100 |
| Make-up Ethylene Rate, lb./hr. | 213 | 213 | 213 |
| Make-up Vinyl Acetate Rate, lb./hr. | 165 | 159 | 146 |
| Make-up CO Rate, lb./hr. | 8 | 8.2 | 7.3 |
| E/VA/CO in Make-up | 55/43/2 | 56/42/2 | 57/40/3 |
| Reactor Feed Rate, lb./hr. | 480/ 410 | 420 | |
| Reaction Pressure, p.s.i. | 30,000 | 30,000 | 30,000 |
| Avg. Feed Temperature, °F. | 103 | 102 | 104 |
| Avg. Reactor Temperature, °F. | | | |
| Level 1 | 225 | 254 | 250 |
| Level 2 | 230 | 260 | 255 |
| Level 3 | 233 | 262 | 257 |
| Level 4 | 232 | 261 | 255 |
| Level 5 | 230 | 259 | 252 |
| Level 6 | 225 | 254 | 250 |
| Production Rate, lb./hr. | 29 | 37 | 34 |
| Monomer Conversion, % | 6 | 9 | 8 |
| Melt Flow Rate[4] | 0.23 | 4.52 | 1.33 |
| % Vinyl Acetate | 43.5 | 46 | 45.9 |

[4] See note 3.

What is claimed is:

1. A process for preparing a copolymer of ethylene, vinyl acetate and carbon monoxide which comprises introducing a copolymerizable mixture containing from about 15 to about 85 percent by weight ethylene, the balance being made up of vinyl acetate and not more than about 5 percent carbon monoxide by weight of the entire mixture, into a polymerization zone and copolymerizing said mixture at an elevated pressure and an average temperature within the range from about 170° F. to about 240° F.

2. The process of claim 1 in which the termonomer mixture contains from about 40 to about 70% ethylene by weight, from about 25 to about 55% vinyl acetate by weight and from about 1 to about 5% carbon monoxide by weight.

3. The process of claim 1 in which an amount of one or more other ethylenically unsaturated monomers copolymerizable with ethylene, vinyl acetate and carbon monoxide is present in the copolymerizable mixture.

4. The process of claim 1 wherein the pressure within the polymerization zone is from about 5,000 p.s.i. to about 60,000 p.s.i.

5. The process of claim 1 carried out in the presence of a free radical polymerization initiator.